Nov. 5, 1968  W. F. MILLER ET AL  3,409,275
PORTABLE WASHER AND COLLECTION TANK ASSEMBLY
Filed Jan. 31, 1967  2 Sheets-Sheet 1
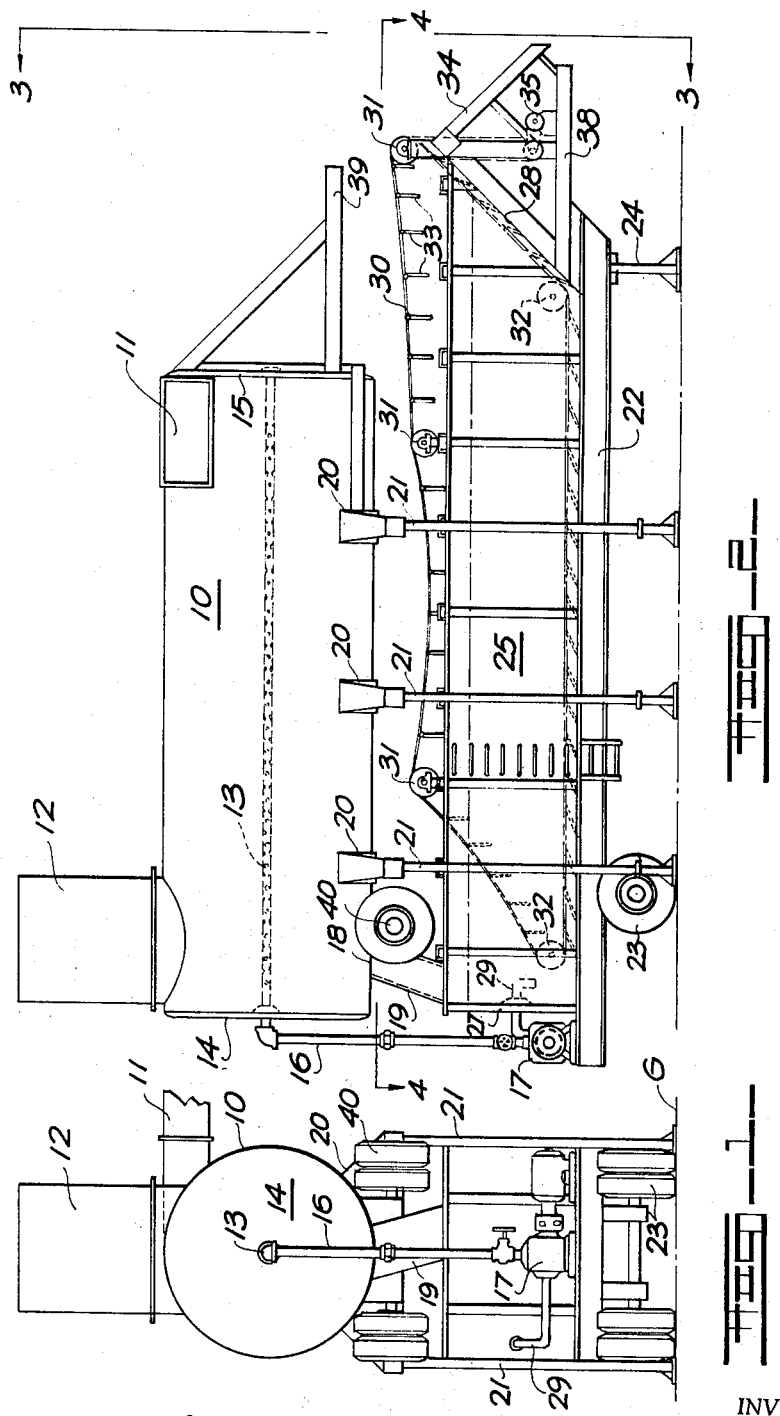
INVENTOR.
John H. Miller & William F. Miller.
BY
W. B. Hanpman
ATTORNEY.

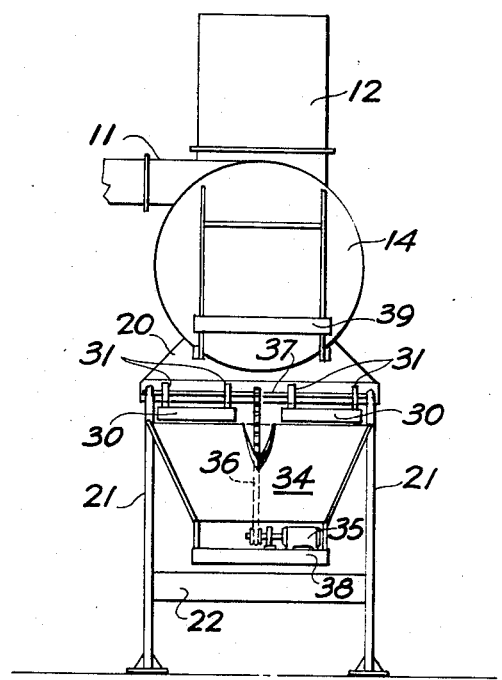
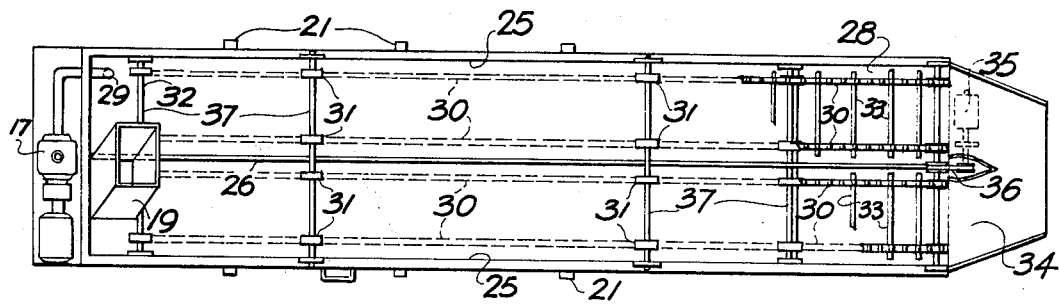

United States Patent Office 3,409,275
Patented Nov. 5, 1968

3,409,275
PORTABLE WASHER AND COLLECTION TANK ASSEMBLY
William F. Miller, 1175 Academy Drive 44505, and John H. Miller, 760 Golf View Drive 44512, both of Youngstown, Ohio
Filed Jan. 31, 1967, Ser. No. 613,032
3 Claims. (Cl. 261—3)

ABSTRACT OF THE DISCLOSURE

A washer and collection tank assembly for receiving airborne dust and material particles acting to separate the same from the air by passing the air and materials therein through a water spray washing area, moving the water, dust and particles therein to a second area and settling the same out of the water and recycling the clear water to the water spray washer, while continually removing the dust and material particles from their settled position to the exterior of the assembly.

---

This invention relates to a portable combination washer and collector for treating airborne dusts, particles and the like, as for example, those produced by an asphalt plant in processing the aggregate prior to and during the mixing of the same with the asphalt. The principal object of the invention is the provision of a portable combination washer and collection tank for airborne materials which may be transported to a job location, assembled and connected to the discharge of a source of contaminated air where it will operate to effectively clean the air and collect the material removed from the air and deliver the same to a desired location for possible reuse.

The portable combination washer and collection tank assembly disclosed herein combines two effective devices in a novel combination, the parts of which may be separated from the assembly and moved individually to a new location when desired and reassembled and used in such new location.

The continuing growth of the asphalt industry, particularly as related to road building and paving operations, requires the use of a number of asphalt and aggregate mixing plants, as the bituminous paving material processed and produced thereby from various aggregates and various bituminous bases, commonly called blacktop, materials must be within a reasonable distance of the actual point of use of the bituminous paving materials, as the same must be transported in a heated condition, spread, leveled and compacted before the material cools to a point where it will no longer properly bond together and form a desirable long wearing road.

The present invention relates to a novel combination of air washer and water settling and collecting devices of a portable nature and construction, capable of being individually transported along conventional highways to a desired point of use, assembled for operation and capable of operating effectively for the intended purpose, whereupon the assembly may be disassembled and transported to another location for subsequent use.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is an end view of the combination washer and collection tank assembly.
FIGURE 2 is the side elevation thereof.
FIGURE 3 is an end elevation thereof, on line 3—3 of FIGURE 2, and
FIGURE 4 is a top plan section on line 4—4 of FIGURE 2.

By referring to the drawings, and FIGURES 1 and 2 in particular, it will be seen that the assembly comprises an air washer tank 10, which is disposed with its longitudinal axis horizontally, and is provided with an air inlet 11 at one end and an air outlet 12 at the other end. An axially extending multiple orifice spray pipe 13 is positioned in the center of the air washer tank 10, and supported at its opposite ends by engagement with the ends 14 and 15 of the air washer tank 10. One end of the multiple orifice spray pipe is closed and the other end communicates with exterior piping 16 which leads to a valve controlled pump 17. The arrangement of the orifices in the multiple orifice spray pipe 13 is such that the entire interior area of the air washer tank 10 is filled with a multiplicity of individual water sprays extending radially from the multiple orifice spray pipe 13, and reaching the cylindrical interior of the horizontally disposed air washer tank 10. At such time as water is being supplied the multiple orifice spray pipe 13 as by the pump 17 and air carrying dust and other airborne material particles is introduced into the air washer tank 10 through the air inlet 11 the same must pass longitudinally of the air washer tank 10 and through the multiplicity of water sprays in order to reach the air outlet 12. In so doing the airborne dust and material particles are effectively washed from the air and are carried to the bottom of the air washer tank 10, where they flow along the same to a water outlet 18 in the bottom thereof which communicates by way of a large tubular connection 19 with one end of an elongated horizontally disposed U-shaped settling and collection tank hereinafter described. The air after being cleaned of the airborne dust and material particles, passes outwardly through the air outlet 12 of the air washer tank 10 and into the atmosphere.

Still referring to FIGURES 1 and 2 of the drawings, it will be observed that the air washer tank 10 is supported in elevated relation to a supporting surface indicated by broken lines G by means of a plurality of transversely positioned support members 20, which are in turn held by a plurality of vertically positioned legs 21. The support members 20 are permanently attached to the exterior of the air washer tank 10 and the legs 21 are detachably connected to the support members 20 so that they may be removed therefrom when the assembly is dismantled and moved to another location.

A horizontally disposed frame 22 supported on one end by a ground engaging wheel and axle combination 23, and on the other end by detachable support jacks 24, is positioned beneath the air washer tank 10 and between the spaced legs 21 and forms the bottom portion of a collection tank which is positioned thereon. The tank includes horizontally spaced longitudinally extending side walls 25 and a central longitudinally extending partition wall 26. The partition wall 26 as best seen in FIGURE 4 of the drawings, extends from a vertical end wall 27 adjacent the pump 17 to an inclined end wall 28 at the opposite end, and is provided with openings adjacent the inclined end wall 28 so that water deposited on one side of the center wall 26 can and will flow toward the inclined end wall 28 and into the area on the other side of the center wall 26. By referring to FIGURE 1 of the drawings it will be seen that the pump 17 is connected by inlet piping 29 with the area on said other side of the central wall 26 so that by the time the water has traveled the full length of the collection tank and back again, the dust and material particles therein will have settled out and clean water will be picked up by the inlet piping connection 29 and delivered to the pump 17 from whence it is pumped into the multiple orifice spray pipe 13 in the air washer tank 10, as heretofore described.

It will thus be seen that the collection tank essential to the operation of the device is formed by the frame 22, the side walls 25, the vertical center wall 26 and the end walls 27 and 28, and that this double tank is positioned directly beneath the air washer tank 10.

In order that the material settling out of the water in the collection tank just described may be continuously and effectively removed therefrom, a pair of chain actuated continuous scraping devices are provided, one in each half of the collection tank on either side of the central vertical partition wall 26. Each of the continuous scraper devices comprises a pair of endless chains 30 trained over a plurality of idlers 31 on the top of the collection tank and beneath a pair of longitudinally spaced secondary idlers 32 located within each side of the collection tank. Freely hanging paddle-like scrapers 33 are attached at their opposite ends to the pairs of chains 30 and are moved thereby to the rearmost pair of idlers 32 in the collection tank adjacent the end wall 27, and are thus positioned in closely spaced relation to the bottom of the collection tank. They move forwardly therealong to the forward pair of idlers 32 adjacent the angularly disposed end wall 28 of the collection tank, and they then move upwardly on an angle comparable therewith and thus each one of the pair of continuous scraping devices formed by the continuous chains and the paddle-like scrapers 33 moves the settled out dust and material particles along the bottom of each half of the collection tank and up the inclined end wall 28 and into a discharge chute 34. Motion is supplied to the continuous chains 31 and the paddle-like scrapers 33 by a motor 35 driving an intermediate chain 36 which is trained over a shaft 37 which is common to the foremost pairs of idlers 31 above the outer uppermost portion of the inclined front wall 28 of the collection tank. The motor 35 is positioned on a forwardly extending elevated portion 38 of the frame 22 and which portion 38 is adapted to engage a fifth wheel on a truck tractor unit when this portion of the portable combination washer and collection tank assembly is disassembled and moved to a new location, as hereinbefore described. A similar forwardly extending portion 39 is formed on the forward end of the air washer tank 10 and serves in a similar capacity when that portion of the assembly is disassembled and moved. An axle and wheel assembly 40 is provided on the opposite end of the air washer tank 10, as best seen in FIGURES 1 and 2 of the drawings and becomes operative when the air washer tank 10 is lowered to the ground and the connecting tubular member 19 removed.

It will thus be seen that in the assembly disclosed, the portable combination washer and collection tank is a highly practical and efficient unit capable of receiving various airborne materials and separating them from the air by means of the efficient water spray through which such airborne materials are forcibly directed, and that the water-borne materials are then separated from the water in the collection tank portion of the assembly, making possible the reuse of the water, all as described hereinbefore.

Having thus described our invention, what we claim is:

1. A portable combination air washer and collection apparatus for airborne dust and material particles, and comprising a first tank defining a single elongated chamber, having an air inlet at one end and an air outlet at its other end, axially extending water spray means in said chamber, a water outlet in said first tank, a separate collection tank having a bottom, side walls and end walls, said collection tank having means in communication with said water outlet, material moving means disposed in said collection tank adjacent to said bottom thereof and arranged to move material settling in said collection tank along said bottom thereof and outwardly along an end wall thereof, and pump means in communication with said collection tank at a point remote from said means communicating with said water outlet of said first tank, said pump means also having means in communication with said spray means in said chamber and means arranged to pump water from said collection tank into said spray means, a horizontal frame member supporting said collection tank, transversely positioned support members connected to said first tank, vertically positioned legs connected to said support members and supporting said first tank above said collection tank, said legs extending downwardly below said frame and said frame having supporting means including wheels at one end and detachable support jacks at the other end.

2. The portable combination air washer and collection apparatus set forth in claim 1, and wherein said first tank is cylindrical and horizontally disposed and said spray means is positioned therein on the entire longitudinal axis thereof.

3. The portable combination air washer and collection apparatus set forth in claim 1, and wherein said collection tank has a central vertical partition and said water outlet of said first tank communicates wtih said tank on one side of said partition and said pump communicates with said tank on the other side of said partition.

References Cited

UNITED STATES PATENTS

| | | | |
|---|---|---|---|
| 2,539,344 | 1/1951 | Carraway | 261—3 |
| 2,608,267 | 8/1952 | Ortgies | 55—238 XR |
| 2,945,683 | 7/1960 | Martinson | 259—159 |
| 2,964,191 | 12/1960 | Arnold et al. | 210—241 |
| 2,999,597 | 9/1961 | Harms | 210—333 |

RONALD R. WEAVER, *Primary Examiner.*